(12) United States Patent
Hsu et al.

(10) Patent No.: US 11,294,266 B2
(45) Date of Patent: Apr. 5, 2022

(54) WAVELENGTH CONVERSION DEVICE HAVING REFLECTIVE LAYER WITH DIFFERENT THICKNESS AND PROJECTION DEVICE USING THE SAME

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/845,094

(22) Filed: Apr. 10, 2020

(65) Prior Publication Data

US 2020/0326615 A1 Oct. 15, 2020

(30) Foreign Application Priority Data

Apr. 12, 2019 (CN) .......................... 201910293402.8

(51) Int. Cl.
  *G03B 21/20* (2006.01)
  *G02B 26/00* (2006.01)
(52) U.S. Cl.
  CPC ......... *G03B 21/204* (2013.01); *G02B 26/008* (2013.01)
(58) Field of Classification Search
  CPC . G03B 21/204; G03B 21/2066; G02B 26/008
  See application file for complete search history.

(56) References Cited

U.S. PATENT DOCUMENTS

| 7,609,746 | B2* | 10/2009 | Yamauchi | G03B 33/12 |
|  |  |  |  | 372/102 |
| 9,255,691 | B2* | 2/2016 | Motoya | F21V 9/08 |
| 9,500,941 | B2* | 11/2016 | Akiyama | G02B 27/48 |
| 9,644,803 | B2* | 5/2017 | Kasugai | H04N 9/3158 |
| 9,753,277 | B2* | 9/2017 | Chang | G02B 5/0284 |
| 9,785,039 | B2* | 10/2017 | Motoya | H01S 5/0092 |

(Continued)

FOREIGN PATENT DOCUMENTS

| CN | 104595852 A | 5/2015 |
| CN | 104769497 A | 7/2015 |

(Continued)

*Primary Examiner* — Bao-Luan Q Le

(57) ABSTRACT

The invention provides a wavelength conversion device and a projection device including the same. The wavelength conversion device includes a substrate, a reflective layer, and a wavelength conversion layer. The reflective layer has different thicknesses in a radial direction of the substrate. The invention further provides another wavelength conversion device and another projection device including the same. In the wavelength conversion device, the reflective layer includes a first colloid and reflective particles distributed in the first colloid. The reflective layer includes an inner reflective layer, a central reflective layer and an outer reflective layer. The concentration of the reflective particles in the central reflective layer is different from the concentration of the reflective particles in the inner reflective layer and the concentration of the reflective particles in the outer reflective layer. The invention can improve the heat dissipation of the wavelength conversion layer, and improve the conversion efficiency.

32 Claims, 11 Drawing Sheets

(56) References Cited

U.S. PATENT DOCUMENTS

| | | | |
|---|---|---|---|
| 9,874,741 B2* | 1/2018 | Egawa | G03B 21/204 |
| 10,338,459 B2* | 7/2019 | Kobayashi | F21V 29/70 |
| 10,578,956 B2* | 3/2020 | Hsieh | F21V 9/32 |
| 10,585,276 B2* | 3/2020 | Hsieh | H04N 9/3144 |
| 10,802,385 B2* | 10/2020 | Maeda | G03B 21/204 |
| 10,942,433 B2* | 3/2021 | Hashizume | G03B 21/16 |
| 2008/0187012 A1* | 8/2008 | Yamauchi | H04N 9/3161 372/26 |
| 2011/0199580 A1* | 8/2011 | Hirata | G03B 21/208 353/31 |
| 2012/0106126 A1* | 5/2012 | Nojima | G03B 33/08 362/84 |
| 2013/0286359 A1* | 10/2013 | Motoya | G03B 21/204 353/31 |
| 2013/0335989 A1* | 12/2013 | Sato | G02B 6/0008 362/510 |
| 2015/0226389 A1* | 8/2015 | Kasugai | G02B 5/3025 353/31 |
| 2015/0301438 A1* | 10/2015 | Akiyama | G03B 21/2033 353/20 |
| 2015/0316233 A1* | 11/2015 | Kawamata | H01L 33/60 362/317 |
| 2015/0381953 A1 | 12/2015 | Egawa | |
| 2016/0040857 A1* | 2/2016 | Inoue | F21V 9/32 362/343 |
| 2016/0077415 A1* | 3/2016 | Motoya | G03B 21/204 353/84 |
| 2016/0091712 A1* | 3/2016 | Egawa | G03B 21/204 353/31 |
| 2017/0003580 A1* | 1/2017 | Sheng | G03B 21/204 |
| 2017/0045732 A1* | 2/2017 | Chang | G02B 5/08 |
| 2019/0049828 A1* | 2/2019 | Maeda | G03B 21/204 |
| 2019/0146318 A1* | 5/2019 | Hsieh | G03B 21/204 362/84 |
| 2019/0249833 A1* | 8/2019 | Hsu | F21S 10/007 |
| 2019/0265583 A1* | 8/2019 | Takahashi | G03B 21/204 |
| 2019/0361221 A1* | 11/2019 | Hsieh | H04N 9/3144 |
| 2019/0378960 A1* | 12/2019 | Chen | G02B 27/0977 |
| 2020/0233193 A1* | 7/2020 | Fan | G02B 6/0096 |

FOREIGN PATENT DOCUMENTS

| | | |
|---|---|---|
| CN | 204730123 U | 10/2015 |
| CN | 105278225 A | 1/2016 |
| CN | 106030835 A | 10/2016 |
| CN | 208239722 U | 12/2018 |
| CN | 109388010 A | 2/2019 |
| CN | 209103006 U | 7/2019 |
| CN | 111077667 A | 4/2020 |

\* cited by examiner

WAVELENGTH CONVERSION DEVICE HAVING REFLECTIVE LAYER WITH DIFFERENT THICKNESS AND PROJECTION DEVICE USING THE SAME

CROSS-REFERENCE TO RELATED APPLICATION

This application claims the priority benefit of China application (CN201910293402.8), filed on Apr. 12, 2019. The entirety of the above-mentioned patent application is hereby incorporated by reference herein and made a part of this specification.

FIELD OF THE INVENTION

The invention relates to a display device, and more particularly relates to a wavelength conversion device and a projection device using the same.

BACKGROUND OF THE INVENTION

The type of light source used in the projection device evolves from ultra-high pressure mercury lamp (UHP lamp) and light emitting diode (LED) to the laser diode (LD) source as the market demands for brightness, color saturation, service life, non-toxicity and environmental protection of the projection device.

Currently, the cost of the high-brightness red laser diodes and green laser diodes is excessive. In order to reduce the cost, blue laser diodes are usually used to excite the phosphor on the phosphor wheel to generate yellow light and green light, and then the required red light is filtered out through a filter wheel. With the blue light emitted by the blue laser diode, the three primary colors of red, green and blue, which are required for the projection image, are formed.

A reflective layer may be disposed under the phosphor layer of the phosphor wheel to reflect the light excited by the blue light. The silver reflective layer has excellent reflectivity, but the cost of the silver is high. Therefore, most of the current method is to adopt a colloid layer mixed with reflective particles as a reflective layer of the phosphor wheel.

In order to coat enough reflective particles to achieve better reflectivity, the thickness of the colloid layer mixed with the reflective particles is greater than the thickness of the silver reflective layer. However, heat is continuously generated when the phosphor in the phosphor layer is excited by the light of the blue laser diode. The conversion efficiency will also decrease if the heat dissipation of the phosphor layer is too slow. The phosphor wheel can absorb heat by adopting a material with high thermal conductivity; however, because the colloid in the reflective layer usually does not have high thermal conductivity and the greater thickness of the colloid is not conducive to the heat dissipation of the phosphor layer, thus the reflective layer may produce significant thermal resistance.

In addition, the energy distribution of the spot formed by the blue laser diode on the phosphor layer is not uniform, and the local phosphor layer corresponding to the region with higher spot energy also generates more heat. If heat cannot be dissipated in time, not only the conversion efficiency of the phosphor layer may decrease, but also deterioration or burnout may happen.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion device having better wavelength conversion efficiency.

The invention provides a wavelength conversion device having high reliability.

The invention provides a projection device including a wavelength conversion device having better wavelength conversion efficiency.

The invention provides a projection device including a wavelength conversion device having high reliability.

Other advantages and objects of the invention may be further illustrated by the technical features broadly embodied and described as follows.

In order to achieve one or a portion of or all of the objects or other objects, an embodiment of the invention provides a wavelength conversion device including a substrate, a reflective layer and a wavelength conversion layer. The substrate has a surface. The reflective layer is disposed on the surface of the substrate and covers a first region of the substrate. The wavelength conversion layer is disposed on the reflective layer, wherein the reflective layer has different thicknesses in a radial direction of the substrate.

In order to achieve one or a portion of or all of the objects or other objects, an embodiment of the invention provides a wavelength conversion device including a substrate, a reflective layer and a wavelength conversion layer. The substrate has a surface. The reflective layer is disposed on the surface of the substrate and covers a first region of the substrate. The wavelength conversion layer is disposed on the reflective layer. The reflective layer includes a first colloid and a plurality of reflective particles. The plurality of reflective particles is distributed in the first colloid. The reflective layer includes an inner reflective layer, a central reflective layer, and an outer reflective layer in a radial direction. The central reflective layer is located between the inner reflective layer and the outer reflective layer. A concentration of the plurality of reflective particles in the central reflective layer is different from a concentration of the plurality of reflective particles in the inner reflective layer and is different from a concentration of the plurality of reflective particles in the outer reflective layer.

In order to achieve one or a portion of or all of the objects or other objects, an embodiment of the invention provides a projection device including an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam. The illumination system includes an excitation light source and an aforementioned wavelength conversion device. The excitation light source is configured to provide an excitation beam.

In one embodiment of the invention, the reflective layer has different thicknesses in the radial direction. Specifically, the region of the reflective layer corresponding to the spot of the excitation beam with a strong energy may have a smaller thickness to reduce the thermal resistance of the region where the wavelength conversion layer releases more heat. Therefore, the wavelength conversion layer is prevented from the low conversion efficiency due to difficulty in heat dissipation, and is even prevented from the problem of deterioration and burn.

In one embodiment of the invention, the reflective layer has different concentrations of reflective particles in the radial direction. The reflective layer has a higher concentration of reflective particles in the region where the spot energy of the excitation beam provided by the excitation light source is stronger to enhance the reflectivity. Since the reflective particles have higher thermal conductivity than that of the first colloid, the wavelength conversion device can resolve the problem of poor local heat dissipation of the wavelength conversion layer, thereby improving the conversion efficiency of the wavelength conversion layer.

In summary, the projection device in the embodiment of the invention may include a wavelength conversion device with better wavelength conversion efficiency and high reliability.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
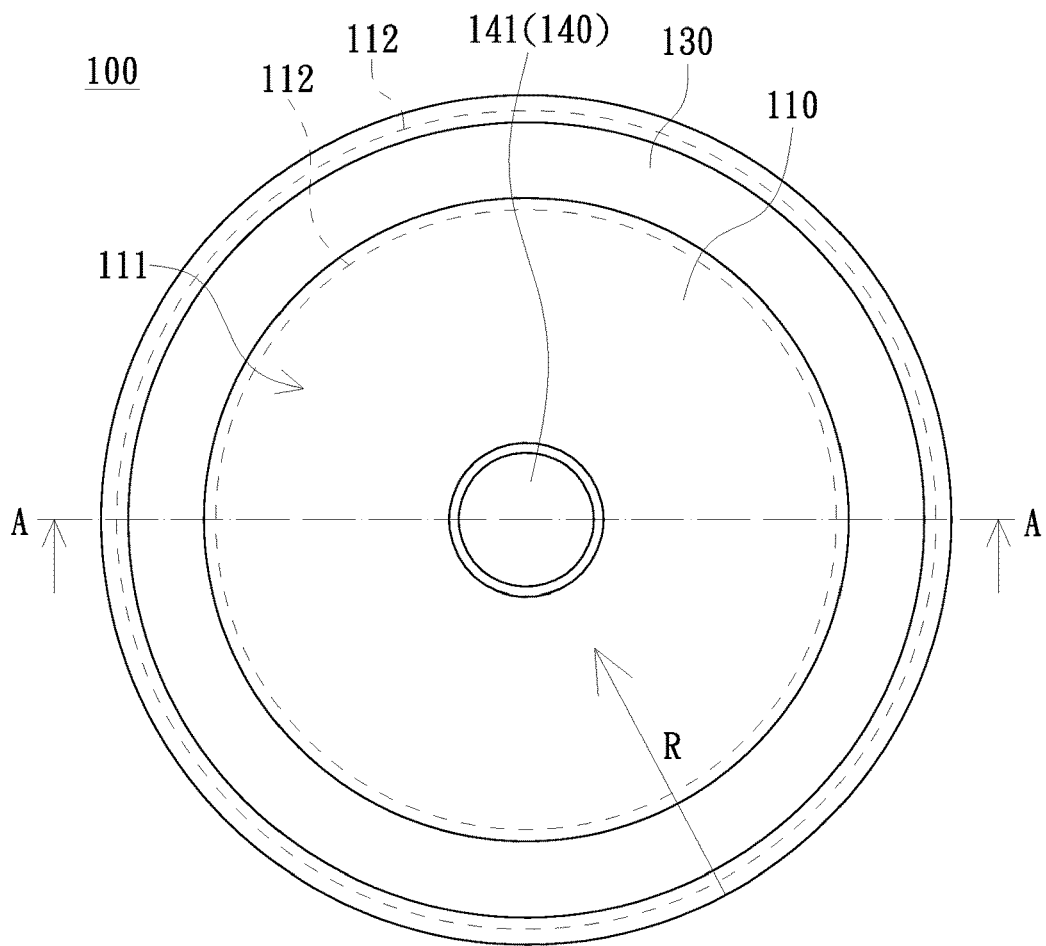
FIG. 1A is a schematic diagram of a wavelength conversion device according to an embodiment of the invention.
Figure 1B:
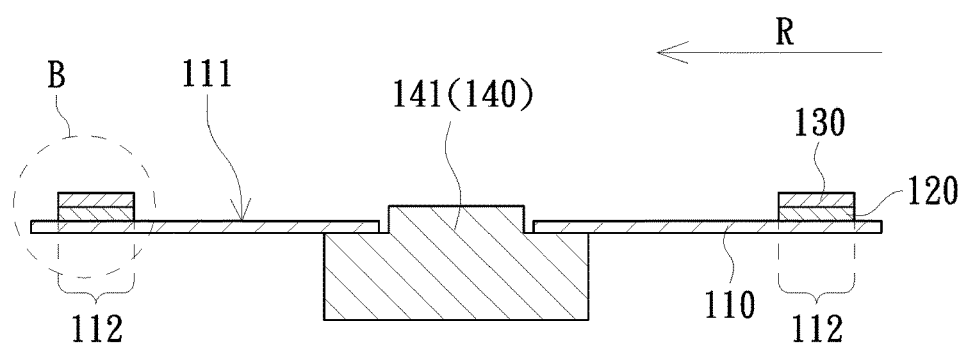
FIG. 1B is a schematic cross-sectional diagram of the wavelength conversion device taken along the line A-A in FIG. 1 A according to an embodiment of the invention.
Figure 1C:
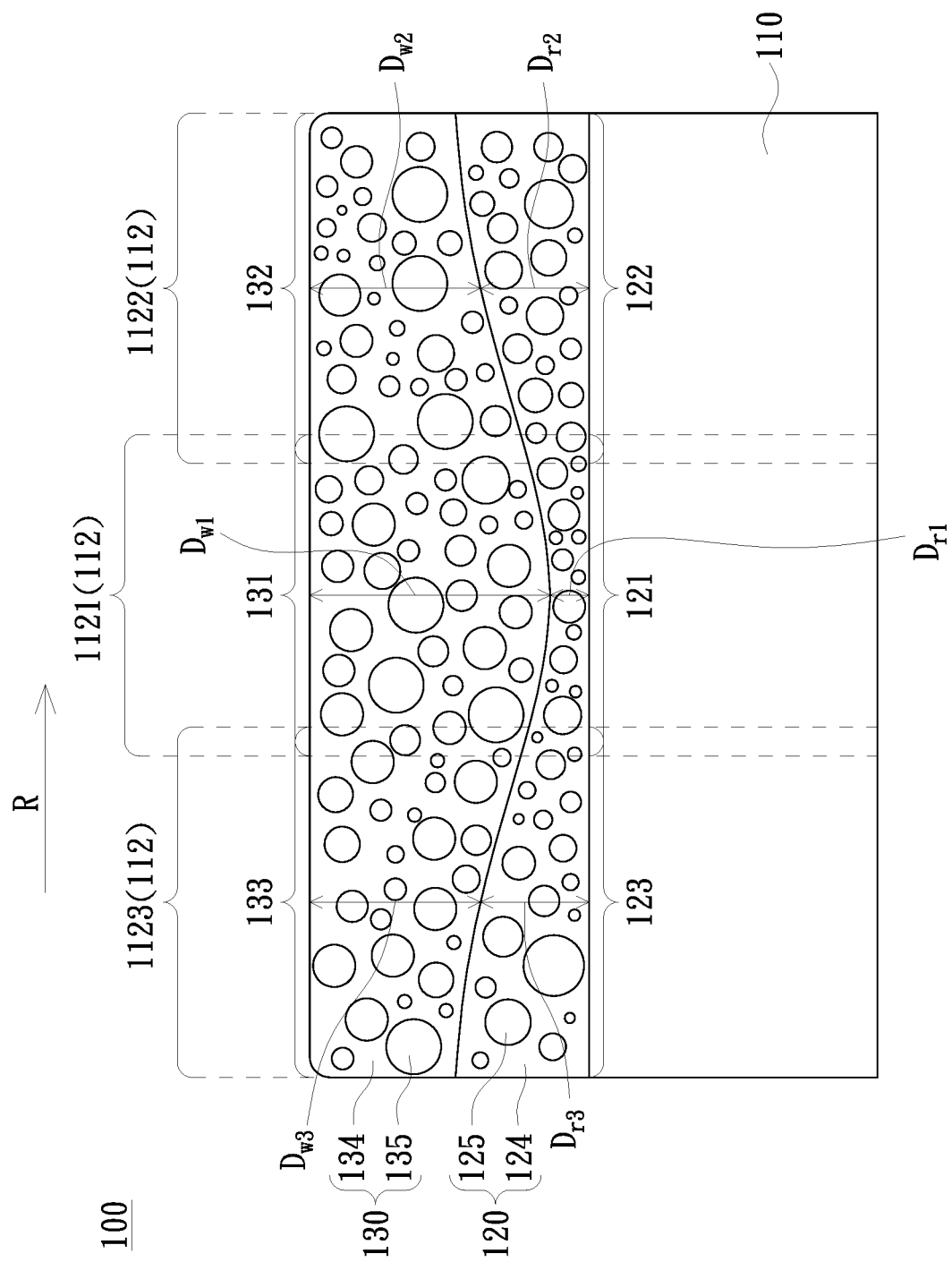
FIG. 1C is a schematic enlargement diagram of the region B of the wavelength conversion device in FIG. 1B according to an embodiment of the invention.
Figure 1D:
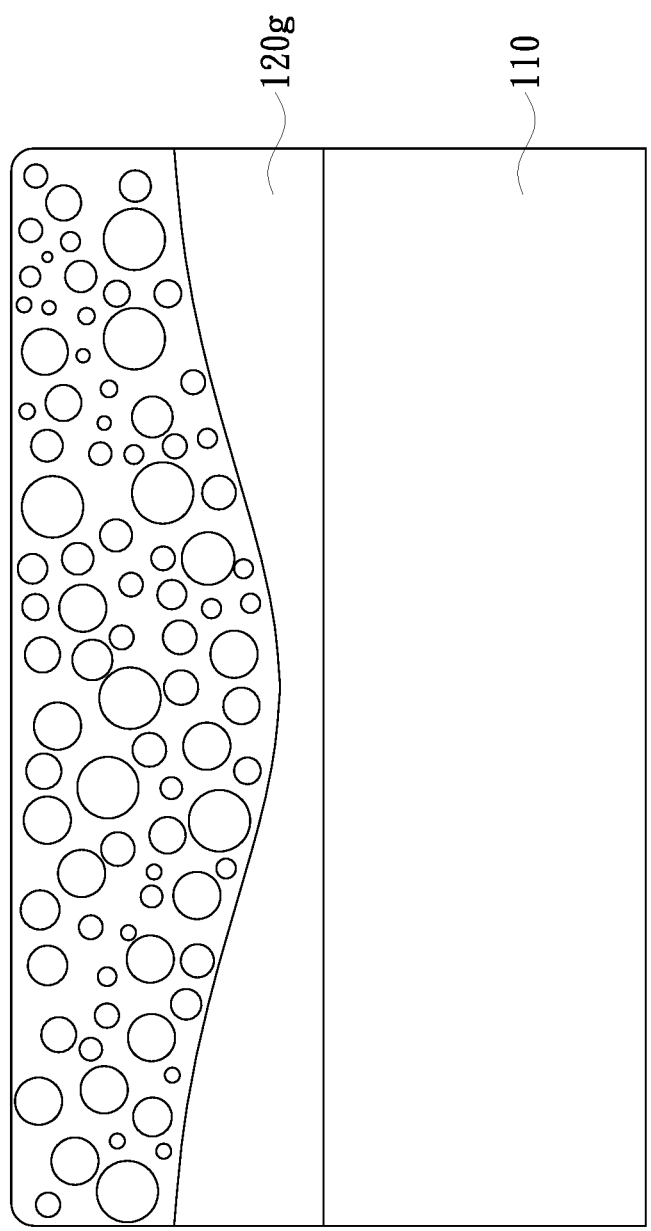
FIG. 1D is a schematic enlargement diagram of the region B of the wavelength conversion device in FIG. 1B according to an embodiment of the invention.
Figure 1E:
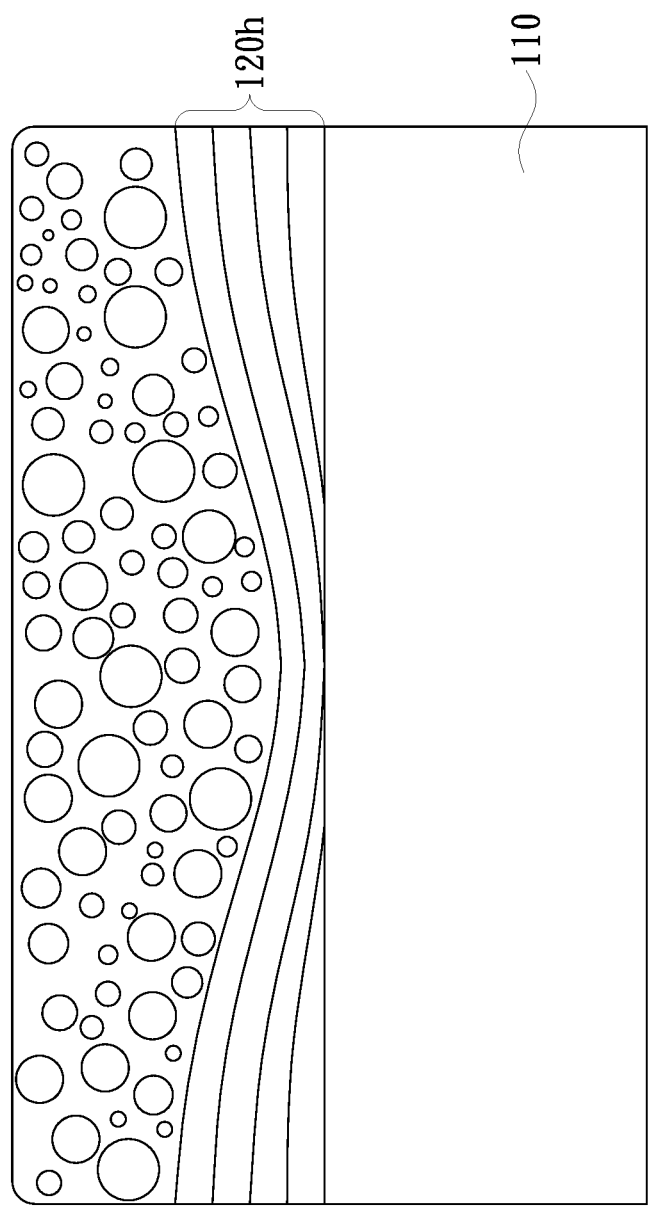
FIG. 1E is a schematic enlargement diagram of the region B of the wavelength conversion device in FIG. 1B according to an embodiment of the invention.

FIG. 1A is a schematic diagram of a wavelength conversion device according to an embodiment of the invention. FIG. 1B is a schematic cross-sectional diagram of the wavelength conversion device taken along the line A-A in FIG. 1A according to the embodiment of the invention. FIGS. 1C to 1E are schematic enlargement diagrams of the region B of the wavelength conversion device in FIG. 1B according to embodiments of the invention. Please refer to FIGS. 1A to 1E. A wavelength conversion device 100 of the embodiment includes a substrate 110, a reflective layer 120 and a wavelength conversion layer 130. The substrate 110 has a surface 111. The reflective layer 120 is disposed on the surface 111 of the substrate 110 and covers a first region 112 of the substrate 110. The wavelength conversion layer 130 is disposed on the reflective layer 120, and the reflective layer 120 has different thicknesses in a radial direction R of the substrate 110.

In an embodiment, the reflective layer 120 includes a first colloid 124 and a plurality of reflective particles 125. The reflective particles 125 are distributed in the first colloid 124. The first colloid 124 is configured to bond the reflective particles 125 to form the reflective layer 120. The material of the first colloid 124 includes silica gel, resin or other glue, which may be formed on the substrate 110 by, for example, coating. The material of the reflective particles 125 may be, for example, titanium dioxide ($TiO_2$), aluminum oxide ($Al_2O_3$) or boron nitride (BN) particles. However, the invention is not limited thereto.

FIG. 1C shows that the reflective layer 120 includes the first colloid 124 and the plurality of reflective particles 125 distributed in the first colloid 124, however, a reflective layer 120g may also include a metal coating as shown in FIG. 1D. In addition, as shown in FIG. 1E, the reflective layer 120h may also include a dielectric coating. The material may be silver or aluminum when the reflective layer 120g includes a metal coating. The material may include a distributed Bragg reflector layer formed by a plurality of silicon dioxide (SiO2) layers and titanium oxide (TiO2) layers alternately stacked when the reflective layer 120h includes a dielectric coating. In addition, the reflective layer 120 may also include a combination of various reflective layers of the aforementioned embodiments. For example, the metal coating or the dielectric coating may be disposed between the reflective layer 120 and the surface 111 of the substrate 110, the reflective layer 120 is formed by the first colloid 124 and the plurality of reflective particles 125.

In an embodiment, the wavelength conversion layer 130 includes a second colloid 134 and a plurality of wavelength conversion particles 135. The plurality of wavelength conversion particles 135 is distributed in the second colloid 134. The second colloid 134 is configured to bond the wavelength conversion particles 135 to form the wavelength conversion layer 130. The material of the second colloid 134 includes silica gel, resin or other glue, which may be formed on the reflective layer 120 by, for example, coating. The material of the wavelength conversion particles 135 may be phosphor materials (e.g., fluorescent materials and phosphorescent materials) or nanomaterials (e.g., quantum dot), but the invention is not limited thereto.

In an embodiment, the substrate 110 may be presented in a shape of a disk, and the wavelength conversion device 100 of the embodiment may further include a motor 140. The motor 140 has a shaft 141, and the motor 140 is configured to drive the substrate 110 to rotate about the shaft 141. The center of the substrate 110 is sleeved on the shaft 141, and the shaft 141 can drive the substrate 110 to rotate. The radial direction R of the substrate 110 may be a direction from an edge of the substrate 110 to the shaft 141 in FIG. 1A. The material of the substrate 110 may be a metal having high thermal conductivity, such as aluminum, but the invention is not limited thereto.

The first region 112 can be used to receive an excitation beam (not shown). The excitation beam is sequentially incident on the wavelength conversion layer 130 and the reflective layer 120. In the wavelength conversion layer 130, the excitation beam is converted into a converted beam (not shown). The converted beam is reflected out of the wavelength conversion layer 130 by the reflective layer 120. In an embodiment, other regions of the substrate 110 may be provided with other wavelength conversion layers, which are different from the wavelength conversion layer 130, to excite converted beams with different colors. For example, in the radial direction R of the substrate 110, the energy distribution of the spot (not shown) of the excitation beam on the first region 112 may be a Gaussian curve in which the energy in the middle region is stronger than that in the edge region.

The first region 112 may be annular or arc, for example, may be presented in a continuous annular shape, but the invention is not limited thereto. In other embodiments, the first region 112 can also be a one sectional or a plurality of sectional C-shaped annular or arc regions. When the first region 112 is annular, in the radial direction R of the substrate 110, the first region 112 includes a central annular region 1121, an inner annular region 1122 and an outer annular region 1123. The central annular region 1121 is located between the inner annular region 1122 and the outer annular region 1123. There may be conspicuous or inconspicuous boundaries between these regions in the first region 112. As shown in FIG. 1C, the central annular region 1121 and the inner annular region 1122 at least partially overlap, and the central annular region 1121 and the outer annular region 1123 at least partially overlap, but the invention is not limited thereto.

In the embodiment, in the radial direction R, the reflective layer 120 includes, for example, a central reflective layer 121, an inner reflective layer 122 and an outer reflective layer 123. The central reflective layer 121 covers the central annular region 1121. The inner reflective layer 122 covers the inner annular region 1122. The outer reflective layer 123 covers the outer annular region 1123. A thickness of the central reflective layer 121 is different from a thickness of the inner reflective layer 122 and is different from a thickness of the outer reflective layer 123. For example, an average thickness of the central reflective layer 121 is smaller than an average thickness of the inner reflective layer 122 and is smaller than an average thickness of the outer reflective layer 123. Further, any thickness Dr1 of the central reflective layer 121 is smaller than any thickness Dr2 of the inner reflective layer 122 and is smaller than any thickness Dr3 of the outer reflective layer 123. The region division for the central reflective layer 121, the inner reflective layer 122 and the outer reflective layer 123 may correspond to the region division for the first region 112, that is, there may be conspicuous or inconspicuous boundaries between the central reflective layer 121, the inner reflective layer 122 and the outer reflective layer 123. As shown in FIG. 1C, the central reflective layer 121 and the inner reflective layer 122 at least partially overlap, and the central reflective layer 121 and the outer reflective layer 123 at least partially overlap. The thickness variation of the reflective layer 120 in the radial direction R may be inversely proportional to the spot energy distribution of the excitation beam irradiated on the first region 112. For example, the central reflective layer 121, which corresponds to a central region where the spot energy is stronger, has a smaller thickness; and the inner reflective layer 122 and the outer reflective layer 123, which correspond to an edge region where the spot energy is weaker, have greater thicknesses. Further, by taking the central reflective layer 121 as a center, the inner reflective layer 122 and the outer reflective layer 123 may have a symmetric thickness variation tendency in the radial direction R or may have different thickness variation tendency in the radial direction R depending on, for example, the energy distribution of the spot. The central reflective layer 121 of the reflective layer 120 has a minimum thickness, while the inner reflective layer 122 or the outer reflective layer 123 has a maximum thickness, and the ratio of the maximum thickness to the minimum thickness may be between 5 and 10.

However, in other embodiments, there may be conspicuous boundaries between each other, when, for example, the central reflective layer 121, the inner reflective layer 122, and the outer reflective layer 123 respectively have a single thickness. Further, the thickness of the inner reflective layer 122 may be the same as or different from the thickness of the outer reflective layer 123.

The wavelength conversion layer 130 includes a central conversion layer 131, an inner conversion layer 132 and an outer conversion layer 133. The central conversion layer 131 covers the central reflective layer 121. The inner conversion layer 132 covers the inner reflective layer 122. The outer conversion layer 133 covers the outer reflective layer 123. The region division between the central conversion layer 131, the inner conversion layer 132 and the outer conversion layer 133 may correspond to the region division for the first region 112, that is, there may be conspicuous or inconspicuous boundaries between the central conversion layer 131, the inner conversion layer 132 and the outer conversion layer 133. In FIG. 1C, a sum of the thickness of the central reflective layer 121 and the thickness of the central conversion layer 131 at any point of the central annular region 1121 (e.g., the thickness Dr1 of the central reflective layer 121 plus a thickness Dw1 of the central conversion layer 131) is equal to a sum of the thickness of the inner reflective layer 122 and the thickness of the inner conversion layer 132 at any point of the inner annular region 1122 (e.g., the thickness Dr2 of the inner reflective layer 122 plus a thickness Dw2 of the inner conversion layer 132) and is equal to a sum of the thickness of the outer reflective layer 123 and the thickness of the outer conversion layer 133 at any point of the outer annular region 1123 (e.g., the thickness Dr3 of the outer reflective layer 123 plus a thickness Dw3 of the outer conversion layer 133).

In the first region 112, the structure of the wavelength conversion layer 130 plus the reflective layer 120 may have a single thickness. In the embodiment, the thickness of the central conversion layer 131 is different from the thickness of the inner conversion layer 132 and is different from the thickness of the outer conversion layer 133. Further, any thickness Dw1 of the central conversion layer 131 of the wavelength conversion layer 130 is greater than any thickness Dw2 of the inner conversion layer 132 and is greater than any thickness Dw3 of the outer conversion layer 133. At any point of the first region 112, a sum of a thickness of the reflective layer 120 and a thickness of the wavelength conversion layer 130 may be in a range of 0.06 mm to 0.6 mm. For example, the thinnest part of the reflective layer 120 may have a thickness of 0.03 mm, or the thickest part of the reflective layer 120 may have a thickness of 0.3 mm. For example, the thinnest part of the wavelength conversion layer 130 may have a thickness of 0.03 mm, or the thickest part of the wavelength conversion layer 130 may have a thickness of 0.3 mm.

The reflective layer 120 of the embodiment has different thicknesses in the radial direction R. Specifically, the central reflective layer 121 of the reflective layer 120 corresponding to the spot of the excitation beam with a strong energy may have a smaller thickness to reduce the thermal resistance of the central conversion layer 131 where the wavelength conversion layer 130 releases more heat. Therefore, the wavelength conversion layer 130 is prevented from the low conversion efficiency due to difficulty in heat dissipation, and is even prevented from the problem of deterioration and burn.

Figure 2:
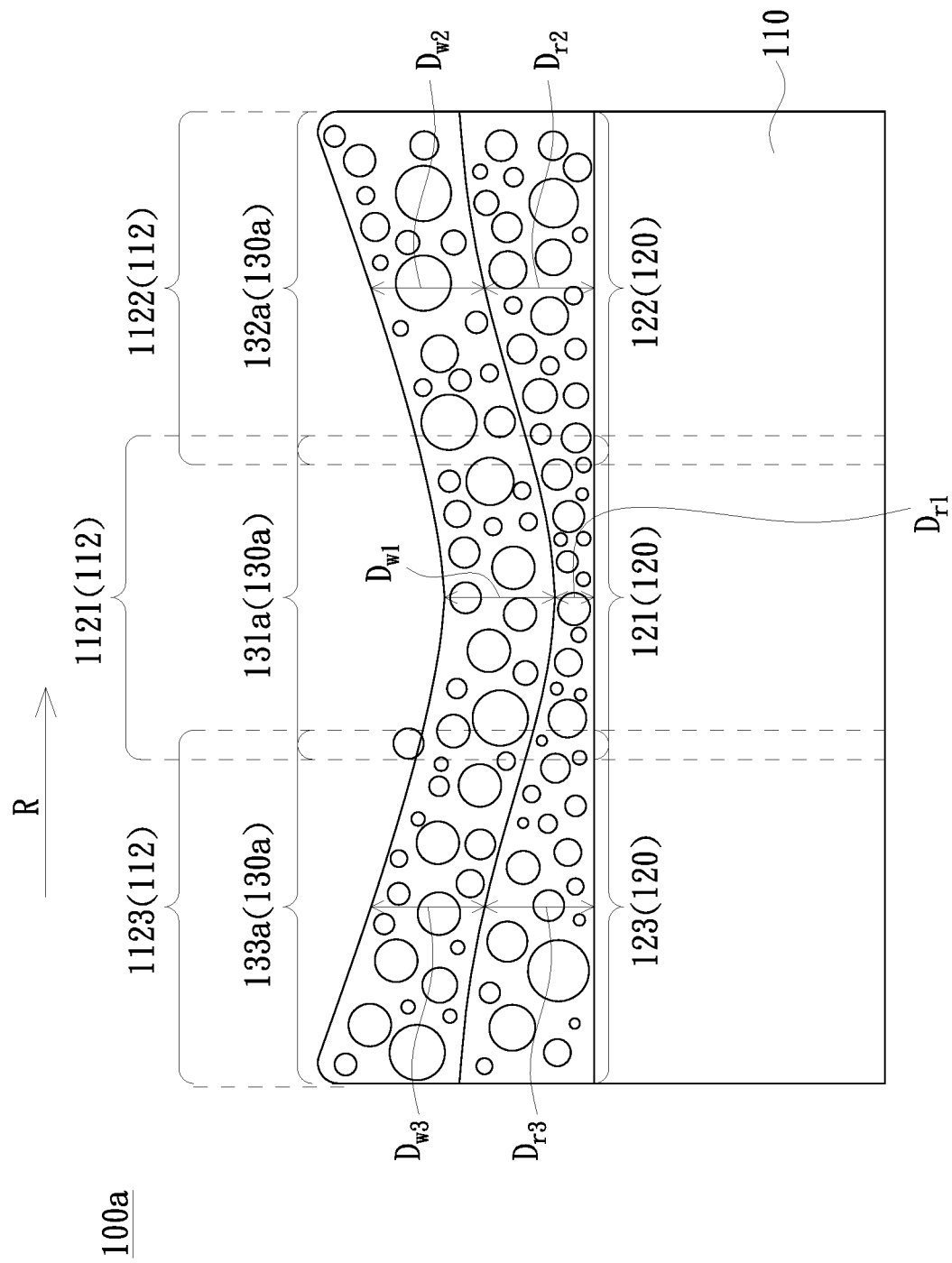
FIG. 2 is a schematic partial cross-sectional diagram of a wavelength conversion device according to another embodiment of the invention.

FIG. 2 is a schematic partial cross-sectional diagram of a wavelength conversion device according to another embodiment of the invention. Please refer to FIG. 2. A wavelength conversion device 100a of the embodiment is substantially the same as the wavelength conversion device 100 of FIG. 1A. The difference is that in the embodiment the sum of the thickness of the central reflective layer 121 and the thickness of a central conversion layer 131a at any point of the central annular region 1121 (e.g., the thickness Dr1 of the central reflective layer 121 plus the thickness Dw1 of the central conversion layer 131a) is smaller than the sum of the thickness of the inner reflective layer 122 and the thickness of an inner conversion layer 132a at any point of the inner annular region 1122 (e.g., the thickness Dr2 of the inner reflective layer 122 plus the thickness Dw2 of the inner conversion layer 132a) and is smaller than the sum of the thickness of the outer reflective layer 123 and the thickness of an outer conversion layer 133a at any point of the outer annular region 1123 (for example, the thickness Dr3 of the outer reflective layer 123 plus the thickness Dw3 of the outer conversion layer 133a). A wavelength conversion layer 130a as a whole may have a single thickness, that is, any thickness Dw1 of the central conversion layer 131a of the wavelength conversion layer 130a is equal to any thickness Dw2 of the inner conversion layer 132a and is equal to any thickness Dw3 of the outer conversion layer 133a, but the invention is not limited thereto.

In the embodiment, the sum of the thickness of the central reflective layer 121 and the thickness of the central conversion layer 131a at any point of the central annular region 1121 is at least 0.06 mm; the sum of the thickness of the inner reflective layer 122 and the thickness of the inner conversion layer 132a at any point of the inner annular region 1122 is at most 0.6 mm; the sum of the thickness of the outer reflective layer 123 and the thickness of the outer conversion layer 133a at any point of the outer annular region 1123 is at most 0.6 mm; but the invention is not limited thereto.

Figure 3:
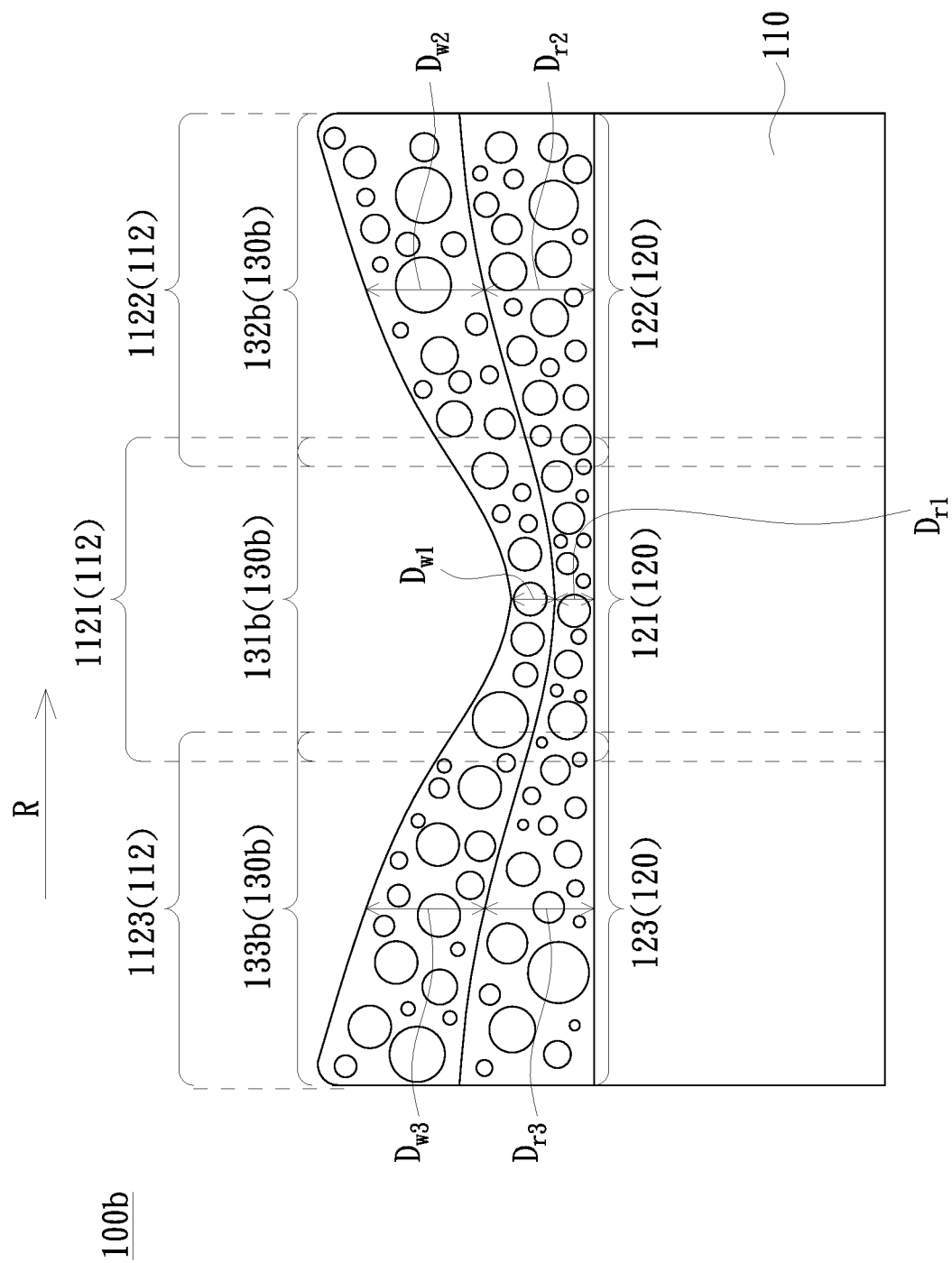
FIG. 3 is a schematic partial cross-sectional diagram of a wavelength conversion device according to another embodiment of the invention.

FIG. 3 is a schematic partial cross-sectional diagram of a wavelength conversion device according to another embodiment of the invention. Please refer to FIG. 3. A wavelength conversion device 100b of the embodiment is substantially the same as the wavelength conversion device 100a of FIG. 2. The difference is that in the embodiment any thickness Dw1 of a central conversion layer 131b of a wavelength conversion layer 130b is different from any thickness Dw2 of an inner conversion layer 132b and is different from any thickness Dw3 of an outer conversion layer 133b. In the embodiment, the thickness Dw1 is smaller than the thickness Dw2 and is smaller than the thickness Dw3, but the invention is not limited thereto. Since the spot of the excitation beam has a higher energy in the central annular region 1121 of the first region 112, the central annular region 1121 having the central reflective layer 121 with a small thickness and the central conversion layer 131b having a small thickness can further reduce the thermal resistance to increase the heat dissipation effect on the wavelength conversion layer 130b.

Figure 4:
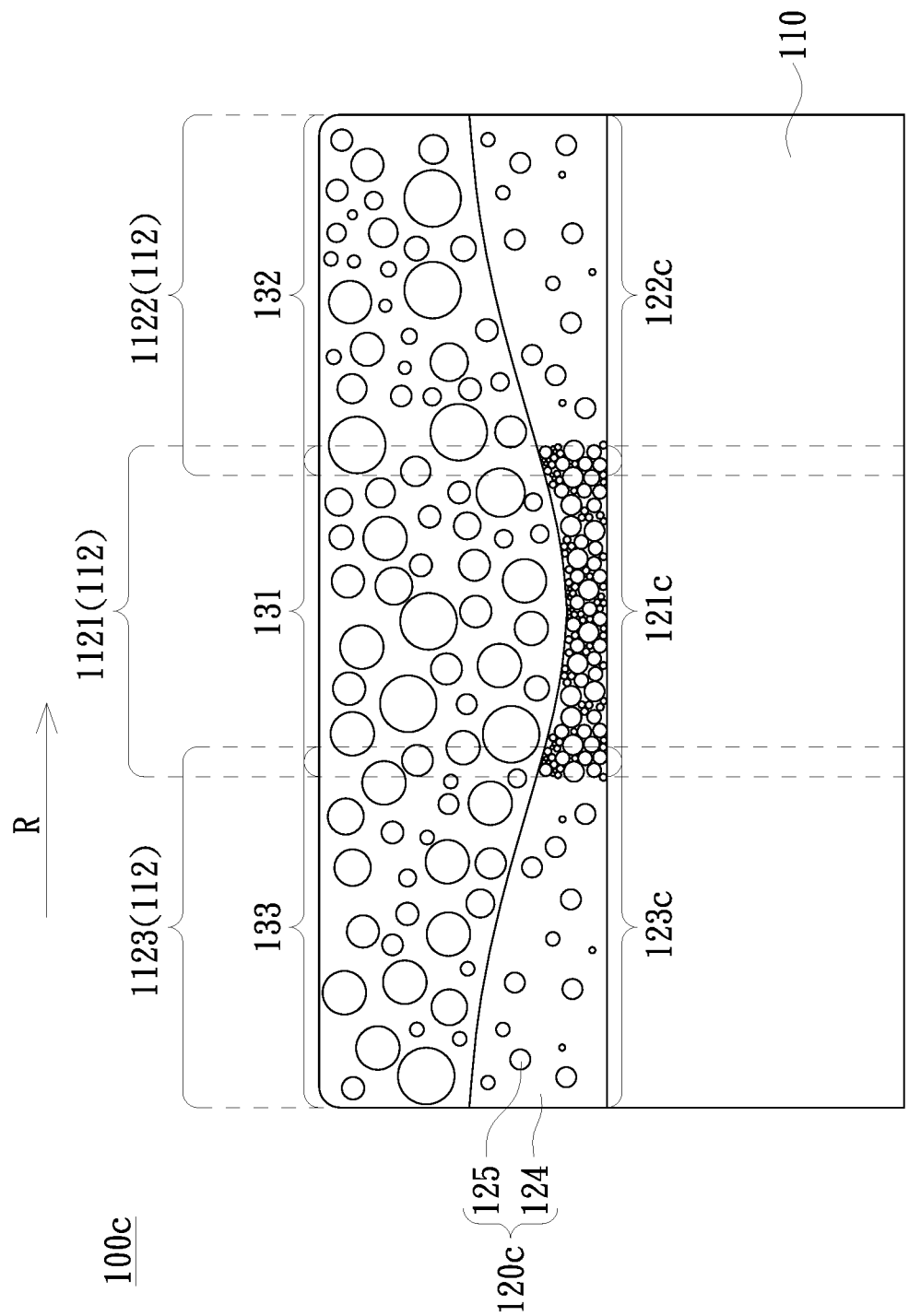
FIG. 4 is a schematic partial cross-sectional diagram of a wavelength conversion device according to another embodiment of the invention.

FIG. 4 is a schematic partial cross-sectional diagram of a wavelength conversion device according to another embodiment of the invention. Please refer to FIG. 3. A wavelength conversion device 100c of the embodiment is substantially the same as the wavelength conversion device 100 of FIG. 1C. The difference is that in the embodiment a concentration of the reflective particles 125 in a central reflective layer 121c is different from a concentration of the reflective particles 125 in an inner reflective layer 122c and is different from a concentration of the reflective particles 125 in an outer reflective layer 123c. For example, the concentration of the reflective particles 125 in the central reflective layer 121c of the reflective layer 120c is greater than the concentration of the reflective particles 125 in the inner reflective layer 122c, and the concentration of the reflective particles 125 in the central reflective layer 121c is greater than the concentration of the reflective particles 125 in the outer reflective layer 123c. In the embodiment, the concentration of the reflective particles 125 in the inner reflective layer 122c may be the same as or different from the concentration of the reflective particles 125 in the outer reflective layer 123c. In an embodiment, a thermal conductivity of the reflective particles 125 is in a range of 1 W/mK to 8 W/mK, and a thermal conductivity of the first colloid 124 is in a range of 0.2 W/mK to 2 W/mK. Since the reflective particles 125 have a higher thermal conductivity than that of the first colloid 124, the reflective particles 125 having a higher concentration in the central reflective layer 121c can quickly conduct the excitation heat generated in the central conversion layer 131 to the substrate 110. A volume concentration of the reflective particles 125 in the reflective layer 120c (121c, 122c, 123c) is in a range of 20% to 80%. For example, the volume concentration of the reflective particles 125 in the central reflective layer 121c may be up to 80%, and the volume concentration of the reflective particles 125 in the inner reflective layer 122c or the outer reflective layer 123c may be 20%. The volume concentration of the reflective particles 125 in the central reflective layer 121c may be 2 to 4 times the volume concentration of the reflective particles 125 in the inner reflective layer 122c or the outer reflective layer 123c.

Figure 5:
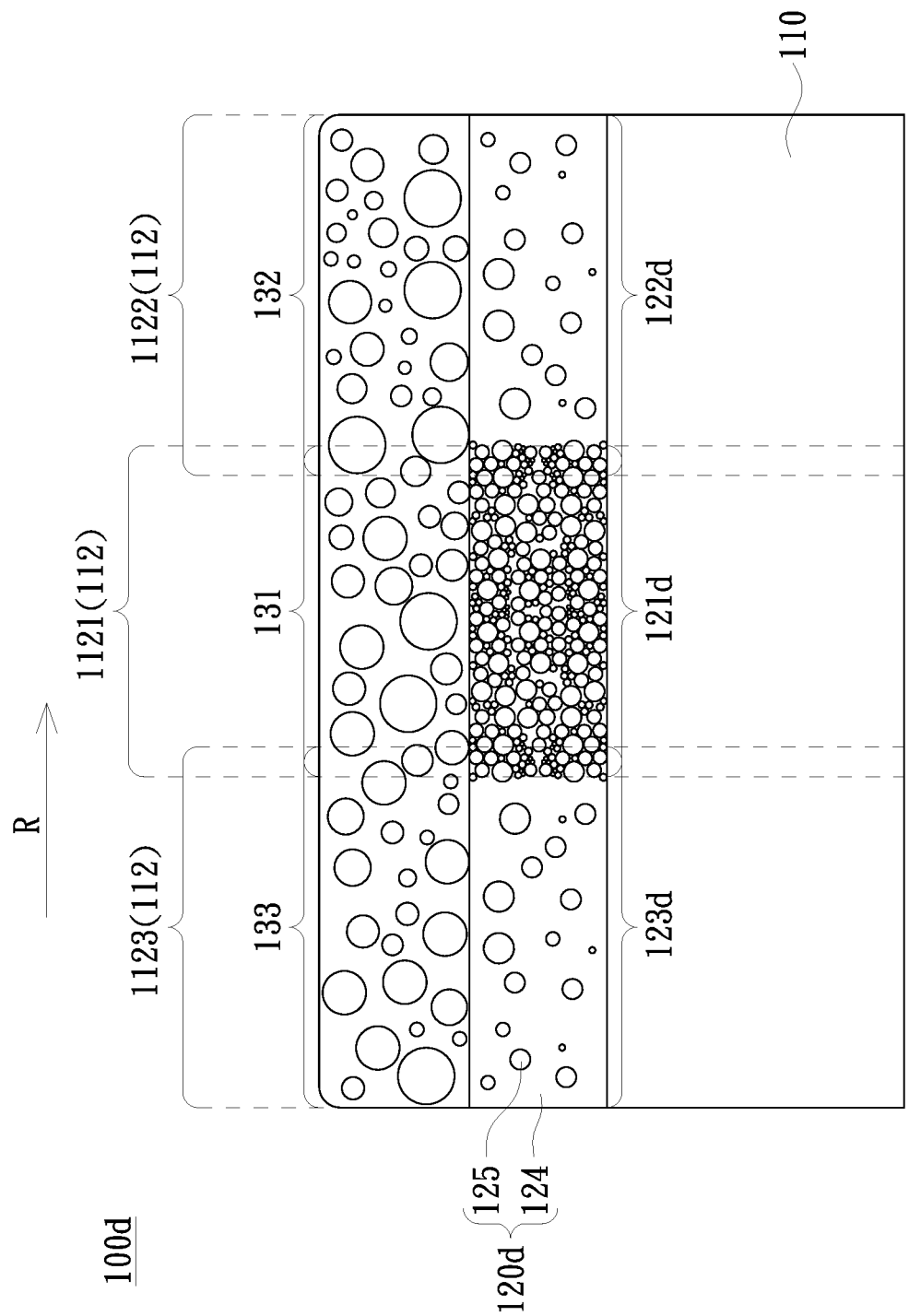
FIG. 5 is a schematic partial cross-sectional diagram of a wavelength conversion device according to another embodiment of the invention.

FIG. 5 is a schematic partial cross-sectional diagram of a wavelength conversion device according to another embodiment of the invention. Please refer to FIG. 5. The wavelength conversion device 100d of the embodiment is substantially the same as the wavelength conversion device 100c of FIG. 4. The difference is that in the embodiment the thickness of a central reflective layer 121d of a reflective layer 120d is equal to the thickness of an inner reflective layer 122d and is equal to the thickness of an outer reflective layer 123d. The reflective layer 120d having a single thickness can have a relatively simplified manufacturing process.

Figure 6:
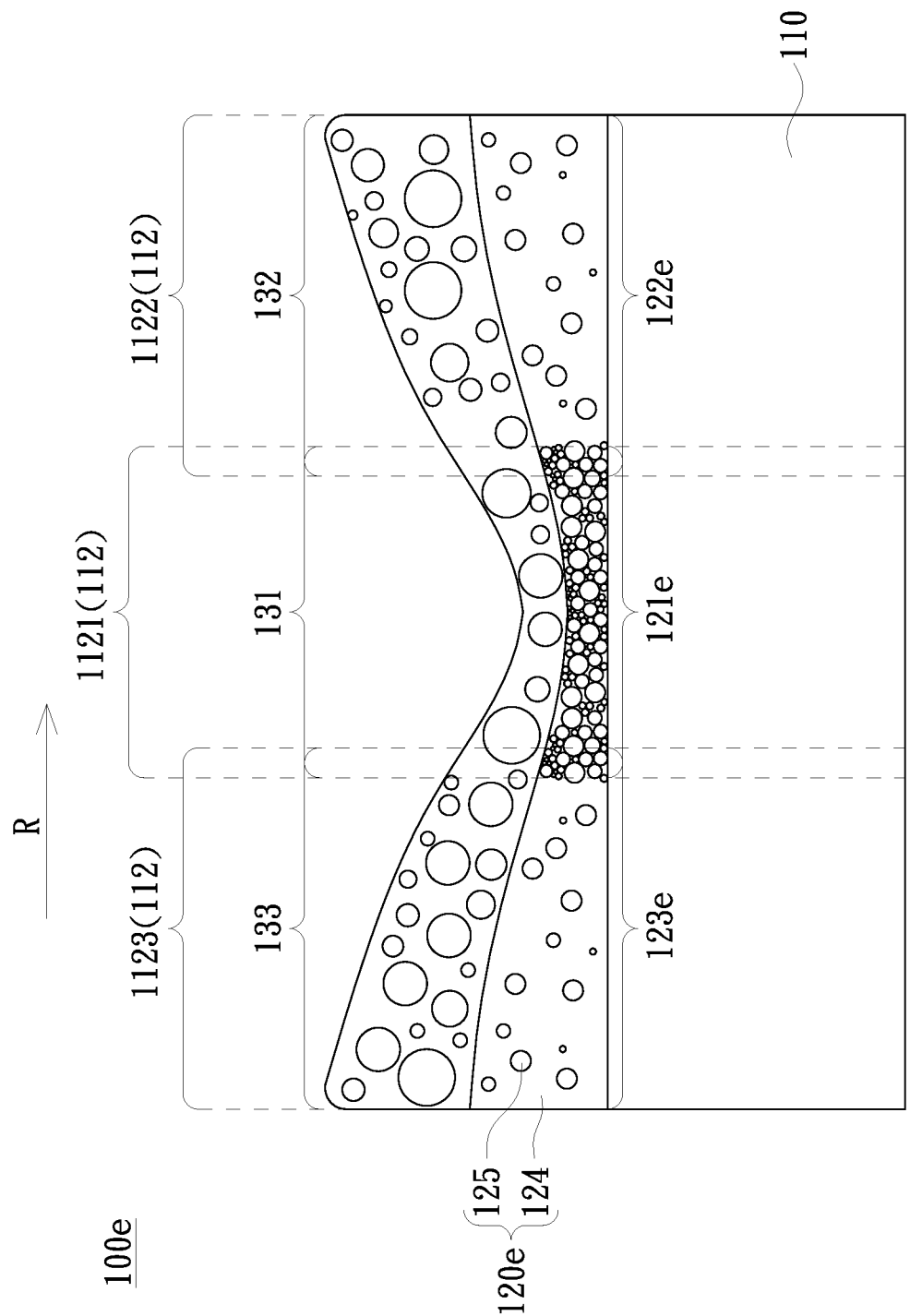
FIG. 6 is a schematic partial cross-sectional diagram of a wavelength conversion device according to another embodiment of the invention.

FIG. 6 is a schematic partial cross-sectional diagram of a wavelength conversion device according to another embodiment of the invention. Please refer to FIG. 6. The wavelength conversion device 100e of the embodiment is substantially the same as the wavelength conversion device 100b of FIG. 3. The difference is that a reflective layer 120e of the embodiment is identical to the reflective layer 120c of FIG. 4. Since the reflective particles 125 have a higher thermal conductivity than that of the first colloid 124, the reflective particles 125 having a higher concentration in a central reflective layer 121e can quickly conduct heat generated in the central conversion layer 131 to the substrate 110.

Figure 7:
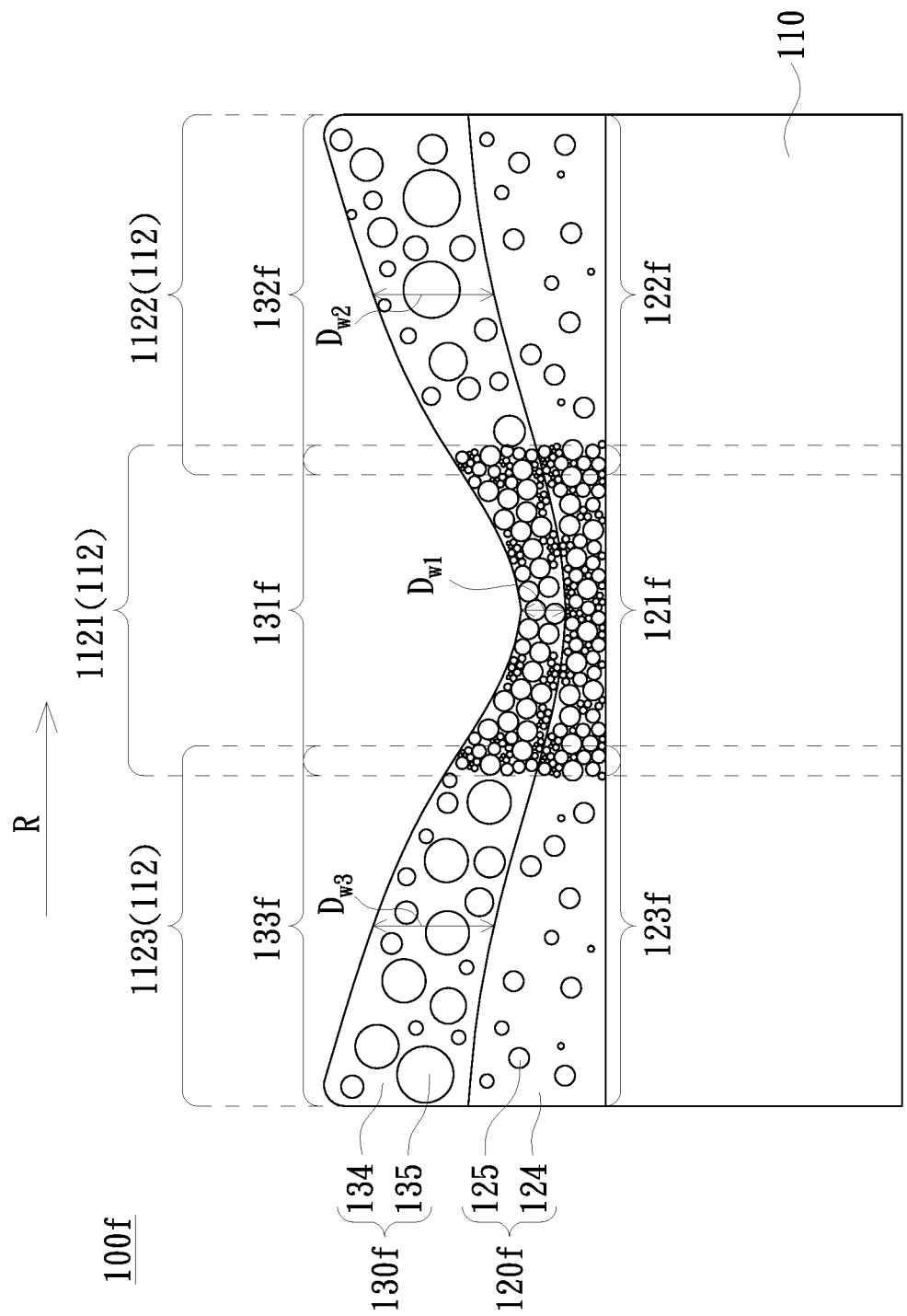
FIG. 7 is a schematic partial cross-sectional diagram of a wavelength conversion device according to another embodiment of the invention.

FIG. 7 is a schematic partial cross-sectional diagram of a wavelength conversion device according to another embodiment of the invention. Please refer to FIG. 7. The wavelength conversion device 100f of the embodiment is substantially the same as the wavelength conversion device 100e of FIG. 6. The difference is that in the embodiment a concentration of the wavelength conversion particles 135 of a central conversion layer 131f is greater than a concentration of the wavelength conversion particles 135 in an inner conversion layer 132f, and the concentration of the wavelength conversion particles 135 of the central conversion layer 131f is greater than a concentration of the wavelength conversion particles 135 in an outer conversion layer 133f. The concentration of the wavelength conversion particles 135 in the inner conversion layer 132f may be the same as or different from the concentration of the wavelength conversion particles 135 in the outer conversion layer 133f. The thermal conductivity of the wavelength conversion particles 135 is in a range of 2 W/mK to 10 W/mK, and the thermal conductivity of the second colloid 134 is in a range of 0.2 W/mK to 2 W/mK. The volume concentration of the wavelength conversion particles 135 in the wavelength conversion layer 130f (131f, 132f, 133f) is in a range of 40% to 90%. For example, the concentration of the wavelength conversion particles 135 in the central conversion layer 131f may be 1.5 times to 2.25 times the concentration of the wavelength conversion particles 135 in the inner conversion layer 132f or the outer conversion layer 133f.

By configuring the central conversion layer 131f to have a small thickness and a high concentration of the wavelength conversion particles 135 and configuring the central reflective layer 121f to have a small thickness and a high concentration of the reflective particles 125, the thermal resistance can be further reduced and the thermal conductivity can be further increased, so as to enhance the heat dissipation effect of the wavelength conversion layer 130f.

Figure 8:
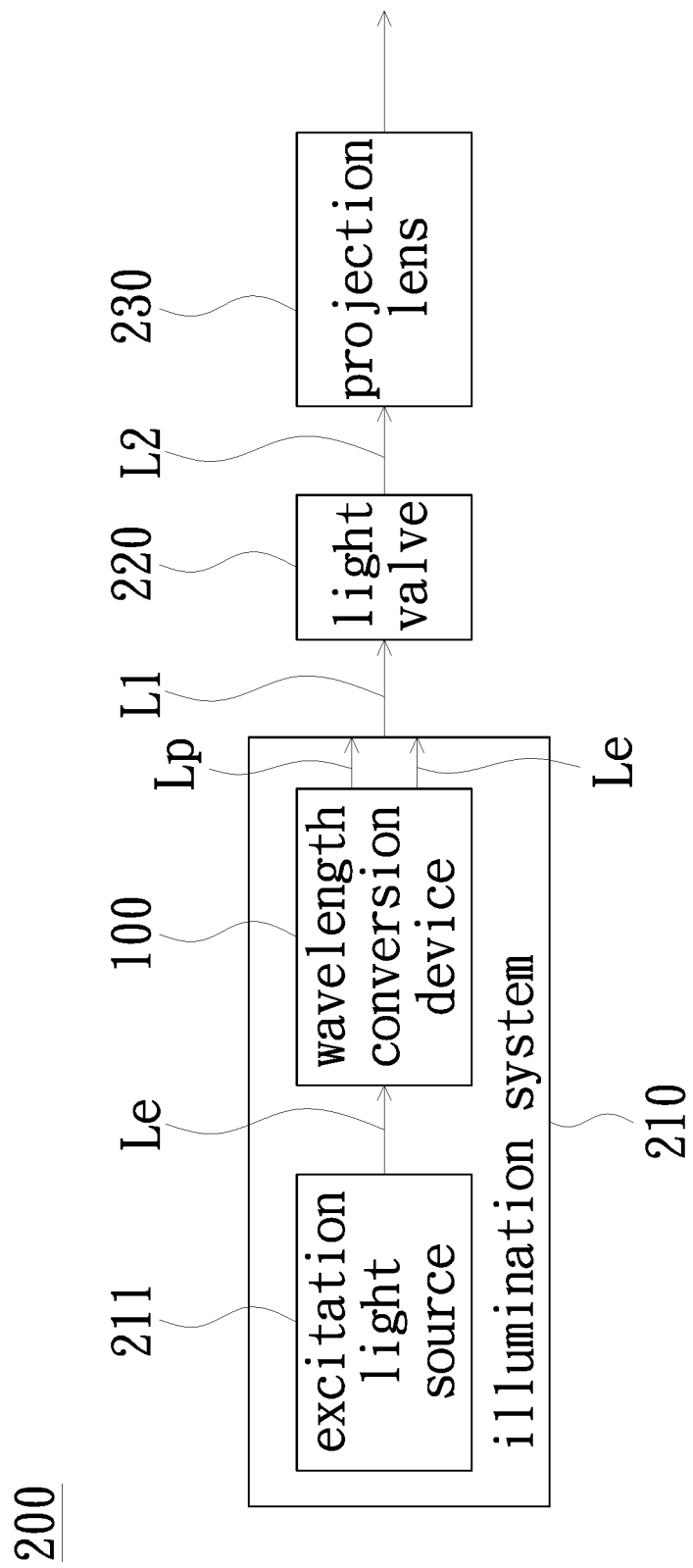
FIG. 8 is a schematic block diagram of a projection device according to an embodiment of the invention.

FIG. 8 is a schematic block diagram of a projection device according to an embodiment of the invention. Please refer to FIG. 8. A projection device 200 of the embodiment includes an illumination system 210, a light valve 220, and a projection lens 230. The illumination system 210 can provide an illumination beam L1. The light valve 220 is disposed on a transmission path of the illumination beam L1 to convert the illumination beam L1 into an image beam L2. The projection lens 230 is disposed on a transmission path of the image beam L2 to project the image beam L2 onto a screen, thereby forming an image frame on the screen. The light valve 220 can be a transmissive light valve or a reflective light valve, the transmissive light valve can be a transmissive liquid crystal panel, and the reflective light valve can be a digital micro-mirror device (DMD), a liquid-crystal display (LCD), a liquid crystal on silicon (LCoS) panel, a transparent liquid crystal panel, an electro-optical modulator, a magneto-optic modulator, or an acousto-optic modulator (AOM).

Please refer to FIGS. 1A to 1C and FIG. 8. The aforementioned illumination system 210 includes an excitation light source 211 and a wavelength conversion device 100. The excitation light source 211 is, for example, a diode module including a light emitting diode or a laser diode chip, or an array including a plurality of diode modules. The excitation light source 211 is configured to provide an excitation beam Le, but the invention is not limited thereto. The wavelength conversion device 100 is disposed on a transmission path of the excitation beam Le. Although FIG. 8 is exemplified by the wavelength conversion device 100 of FIG. 1, the wavelength conversion device 100 can be replaced with the wavelength conversion device of any of the aforementioned embodiments.

The aforementioned excitation beam Le may be irradiated on the first region 112 of the wavelength conversion device 100. The wavelength conversion layer 130 of the first region 112 can convert the excitation beam Le into a converted beam Lp as the wavelength conversion device 100 rotates. The converted beam Lp is reflected by the reflective layer 120. The wavelength of the converted beam Lp is different from the wavelength of the excitation beam Le. As such, the aforementioned illumination beam L1 includes the converted beam Lp and the unconverted excitation beam Le. The illumination system 210 can also include other optical components to transmit the illumination beam L1 to the light valve 220.

In one embodiment of the invention, the reflective layer has different thicknesses in the radial direction. Specifically, the region of the reflective layer corresponding to the spot of the excitation beam with a strong energy may have a smaller thickness to reduce the thermal resistance of the region where the wavelength conversion layer releases more heat. Therefore, the wavelength conversion layer is prevented from the low conversion efficiency due to difficulty in heat dissipation, and is even prevented from the problem of deterioration and burn.

In one embodiment of the invention, the reflective layer has different concentrations of reflective particles in the radial direction. Specifically, the reflective layer has a higher concentration of reflective particles in the region where the spot energy of the excitation beam provided by the excitation light source is stronger. Since the reflective particles has a thermal conductivity greater than that of the first colloid, the problem of poor local heat dissipation of the wavelength conversion layer can be resolved, thereby improving the conversion efficiency of the wavelength conversion layer.

In summary, the projection device in the embodiment of the invention may include a wavelength conversion device with better wavelength conversion efficiency and high reliability.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first region, the second region, the first colloid and the second colloid are only used for distinguishing various elements and do not limit the number of the elements.

What is claimed is:

1. A wavelength conversion device, comprising a substrate, a reflective layer and a wavelength conversion layer, wherein:
    the substrate has a surface;
    the reflective layer is disposed on the surface of the substrate and covers a first region of the substrate; and
    the wavelength conversion layer is disposed on the reflective layer, wherein a thickness of the reflective layer is gradually increased from a center to two ends of the reflective layer in a radial direction of the substrate,
    wherein the first region is annular or arc.

2. The wavelength conversion device according to claim 1, wherein the reflective layer comprises a metal coating or a dielectric coating.

3. The wavelength conversion device according to claim 1, further comprising a motor having a shaft, wherein the motor is configured to drive the substrate to rotate about the shaft.

4. The wavelength conversion device according to claim 1, wherein the first region comprises a central annular region, an inner annular region and an outer annular region, and the central annular region is located between the inner annular region and the outer annular region.

5. The wavelength conversion device according to claim 4, wherein the reflective layer comprises a central reflective layer, an inner reflective layer and an outer reflective layer, the central reflective layer covers the central annular region, the inner reflective layer covers the inner annular region, and the outer reflective layer covers the outer annular region, wherein the wavelength conversion layer comprises a central conversion layer, an inner conversion layer and an outer conversion layer, the central conversion layer covers the central reflective layer, the inner conversion layer covers the inner reflective layer, and the outer conversion layer covers the outer reflective layer.

6. The wavelength conversion device according to claim 4, wherein the central annular region and the inner annular region at least partially overlap, and the central annular region and the outer annular region at least partially overlap.

7. The wavelength conversion device according to claim 5, wherein the reflective layer comprises a first colloid and a plurality of reflective particles, and the plurality of reflective particles is distributed in the first colloid.

8. The wavelength conversion device according to claim 5, wherein a sum of a thickness of the reflective layer and a thickness of the wavelength conversion layer is in a range of 0.06 mm to 0.6 mm.

9. The wavelength conversion device according to claim 8, wherein a sum of a thickness of the central reflective layer and a thickness of the central conversion layer is at least 0.06 mm, and a sum of a thickness of the inner reflective layer and a thickness of the inner conversion layer is at most 0.6 mm.

10. The wavelength conversion device according to claim 8, wherein a sum of a thickness of the central reflective layer and a thickness of the central conversion layer is at least 0.06 mm, and a sum of a thickness of the outer reflective layer and a thickness of the outer conversion layer is at most 0.6 mm.

11. The wavelength conversion device according to claim 7, wherein an average thickness of the central reflective layer is smaller than an average thickness of the inner reflective layer and is smaller than an average thickness of the outer reflective layer, wherein a concentration of the plurality of reflective particles in the central reflective layer is greater than a concentration of the plurality of reflective particles in the inner reflective layer and is greater than a concentration of the plurality of reflective particles in the outer reflective layer.

12. The wavelength conversion device according to claim 7, wherein a thermal conductivity of the plurality of reflective particles is in a range of 1 W/mK to 8 W/m K, and a thermal conductivity of the first colloid is in a range of 0.2 W/mK to 2 W/mK.

13. The wavelength conversion device according to claim 7, wherein a volume concentration of the plurality of the reflective particles in the reflective layer is in a range of 20% to 80%.

14. The wavelength conversion device according to claim 11, wherein a thickness of the central conversion layer is different from a thickness of the inner conversion layer and is different from a thickness of the outer conversion layer.

15. The wavelength conversion device according to claim 11, wherein a thickness of the central conversion layer is equal to a thickness of the inner conversion layer and is equal to a thickness of the outer conversion layer.

16. The wavelength conversion device according to claim 14, wherein a sum of a thickness of the central reflective layer and a thickness of the central conversion layer is equal to a sum of a thickness of the inner reflective layer and a thickness of the inner conversion layer and is equal to a sum of a thickness of the outer reflective layer and a thickness of the outer conversion layer.

17. The wavelength conversion device according to claim 16, wherein a sum of the thickness of the central reflective layer and the thickness of the central conversion layer is smaller than a sum of the thickness of the inner reflective layer and the thickness of the inner conversion layer and is smaller than a sum of the thickness of the outer reflective layer and the thickness of the outer conversion layer.

18. A wavelength conversion device, comprising a substrate, a reflective layer and a wavelength conversion layer, wherein:
the substrate has a surface;
the reflective layer is disposed on the surface of the substrate and covers a first region of the substrate; and
the wavelength conversion layer is disposed on the reflective layer, wherein the reflective layer has different thicknesses in a radial direction of the substrate,
wherein the first region comprises a central annular region, an inner annular region and an outer annular region, and the central annular region is located between the inner annular region and the outer annular region,
wherein the reflective layer comprises a central reflective layer, an inner reflective layer and an outer reflective layer, the central reflective layer covers the central annular region, the inner reflective layer covers the inner annular region, and the outer reflective layer covers the outer annular region, wherein the wavelength conversion layer comprises a central conversion layer, an inner conversion layer and an outer conversion layer, the central conversion layer covers the central reflective layer, the inner conversion layer covers the inner reflective layer, and the outer conversion layer covers the outer reflective layer,
wherein an average thickness of the central reflective layer is smaller than an average thickness of the inner reflective layer and is smaller than an average thickness of the outer reflective layer.

19. The wavelength conversion device according to claim 18, wherein a thickness of the central conversion layer is different from a thickness of the inner conversion layer and is different from a thickness of the outer conversion layer.

20. The wavelength conversion device according to claim 18, wherein a thickness of the central conversion layer is equal to a thickness of the inner conversion layer and is equal to a thickness of the outer conversion layer.

21. The wavelength conversion device according to claim 19, wherein a sum of a thickness of the central reflective layer and a thickness of the central conversion layer is equal to a sum of a thickness of the inner reflective layer and a thickness of the inner conversion layer and is equal to a sum of a thickness of the outer reflective layer and a thickness of the outer conversion layer.

22. The wavelength conversion device according to claim 19, wherein a sum of the thickness of the central reflective layer and the thickness of the central conversion layer is smaller than a sum of the thickness of the inner reflective layer and the thickness of the inner conversion layer and is smaller than a sum of the thickness of the outer reflective layer and the thickness of the outer conversion layer.

23. A wavelength conversion device, comprising a substrate, a reflective layer and a wavelength conversion layer, wherein:
the substrate has a surface;
the reflective layer is disposed on the surface of the substrate and covers a first region of the substrate; and
the wavelength conversion layer is disposed on the reflective layer, wherein the reflective layer has different thicknesses in a radial direction of the substrate,
wherein the first region comprises a central annular region, an inner annular region and an outer annular region, and the central annular region is located between the inner annular region and the outer annular region,
wherein the reflective layer comprises a central reflective layer, an inner reflective layer and an outer reflective layer, the central reflective layer covers the central annular region, the inner reflective layer covers the inner annular region, and the outer reflective layer covers the outer annular region, wherein the wavelength conversion layer comprises a central conversion layer, an inner conversion layer and an outer conversion layer, the central conversion layer covers the central reflective layer, the inner conversion layer covers the inner reflective layer, and the outer conversion layer covers the outer reflective layer,
wherein the wavelength conversion layer comprises a second colloid and a plurality of wavelength conversion particles, the plurality of wavelength conversion particles are distributed in the second colloid, a concentration of the plurality of wavelength conversion particles in the central conversion layer is greater than a concentration of the plurality of wavelength conversion particles in the inner conversion layer and is greater than a concentration of the plurality of wavelength conversion particles in the outer conversion layer.

24. The wavelength conversion device according to claim 23, wherein a thermal conductivity of the plurality of wavelength conversion particles is in a range of 2 W/mK to 10 W/mK, and a thermal conductivity of the second colloid is in a range of 0.2 W/mK to 2 W/m K.

25. The wavelength conversion device according to claim 23, wherein a volume concentration of the plurality of the wavelength conversion particles in the wavelength conversion layer is in a range of 40% to 90%.

26. A wavelength conversion device, comprising a substrate, a reflective layer and a wavelength conversion layer, wherein
the substrate has a surface;
the reflective layer is disposed on the surface of the substrate and covers a first region of the substrate; and
the wavelength conversion layer is disposed on the reflective layer, wherein
the reflective layer comprises a first colloid and a plurality of reflective particles, the plurality of reflective particles is distributed in the first colloid, the reflective layer comprises an inner reflective layer, a central reflective layer, and an outer reflective layer in a radial direction, wherein the central reflective layer is located between the inner reflective layer and the outer reflective layer, wherein
a concentration of the plurality of reflective particles in the central reflective layer is different from a concentration of the plurality of reflective particles in the inner reflective layer and is different from a concentration of the plurality of reflective particles in the outer reflective layer.

27. The wavelength conversion device according to claim 26, wherein the concentration of the plurality of reflective particles in the central reflective layer is greater than the concentration of the plurality of reflective particles in the inner reflective layer and is greater than the concentration of the plurality of reflective particles in the outer reflective layer.

28. The wavelength conversion device according to claim 26, wherein the central reflective layer and the inner reflective layer at least partially overlap, and the central reflective layer and the outer reflective layer at least partially overlap.

29. The wavelength conversion device according to claim 27, wherein a thickness of the central reflective layer is equal to a thickness of the inner reflective layer and is equal to a thickness of the outer reflective layer.

30. A projection device comprising an illumination system, a light valve and a projection lens, wherein the illumination system is configured to provide an illumination beam, the light valve is disposed on a transmission path of the illumination beam to convert the illumination beam into an image beam, and the projection lens is disposed on a transmission path of the image beam, the illumination system comprises an excitation light source and a wavelength conversion device, the excitation light source is configured to provide an excitation beam, the wavelength conversion device comprises a substrate, a reflective layer, and a wavelength conversion layer, wherein
the substrate has a surface;
the reflective layer is disposed on the surface of the substrate, and the reflective layer covers a first region of the substrate; and
the wavelength conversion layer is disposed on the reflective layer, wherein a thickness of the reflective layer is gradually increased from a center to two ends of the reflective layer in a radial direction of the substrate, wherein the first region is annular or arc, wherein
the excitation beam is incident on the surface of the wavelength conversion device, and the wavelength conversion device converts a portion of the excitation beam into a converted beam, wherein
the illumination beam comprises the converted beam and another portion of the excitation beam.

31. A projection device comprising an illumination system, a light valve, and a projection lens, wherein the illumination system is configured to provide an illumination beam, the light valve is disposed on a transmission path of the illumination beam to convert the illumination beam into an image beam, and the projection lens is disposed on a transmission path of the image beam, the illumination system comprises an excitation light source and a wavelength conversion device, the excitation light source is configured to provide an excitation beam, the wavelength conversion device comprises a substrate, a reflective layer, and a wavelength conversion layer, wherein
the substrate has a surface;
the reflective layer is disposed on the surface of the substrate and covers a first region of the substrate; and
the wavelength conversion layer is disposed on the reflective layer, wherein
the reflective layer comprises a first colloid and a plurality of reflective particles, the plurality of reflective particles is distributed in the first colloid, the reflective layer comprises an inner reflective layer, a central reflective layer, and an outer reflective layer in a radial direction, wherein the central reflective layer is located between the inner reflective layer and the outer reflective layer, wherein
a concentration of the plurality of reflective particles in the central reflective layer is different from a concentration of the plurality of reflective particles in the inner reflective layer and is different from a concentration of the plurality of reflective particles in the outer reflective layer,
the excitation beam is incident on the surface of the wavelength conversion device, and the wavelength conversion device converts a portion of the excitation beam into a converted beam, wherein
the illumination beam comprises the converted beam and another portion of the excitation beam.

32. A wavelength conversion device, comprising a substrate, a reflective layer and a wavelength conversion layer, wherein
the substrate has a surface;
the reflective layer is disposed on the surface of the substrate and covers a first region of the substrate; and
the wavelength conversion layer is disposed on the reflective layer, wherein
the first region comprises a central annular region, an inner annular region and an outer annular region, and the central annular region is located between the inner annular region and the outer annular region;
the reflective layer comprises a first colloid and a plurality of reflective particles, the plurality of reflective particles is distributed in the first colloid, wherein
a concentration of the plurality of reflective particles in a portion of the reflective layer corresponding to the central annular region is different from a concentration of the plurality of reflective particles in a portion of the reflective layer corresponding to the inner annular region, and the concentration of the plurality of reflective particles in a portion of the reflective layer corresponding to the central annular region is different from a concentration of the plurality of reflective particles in a portion of the reflective layer corresponding to the outer annular region.

* * * * *